Oct. 15, 1946.　　M. L. DONNELLAN　　2,409,551
AIRCRAFT PROPULSION
Filed June 15, 1942　　2 Sheets-Sheet 1

INVENTOR.
Maurice L. Donnellan
BY
Earl T. Chappell

Oct. 15, 1946.　　　M. L. DONNELLAN　　　2,409,551
AIRCRAFT PROPULSION
Filed June 15, 1942　　　2 Sheets-Sheet 2

INVENTOR.
Maurice L. Donnellan
BY
Earl T. Chaffell

Patented Oct. 15, 1946

2,409,551

UNITED STATES PATENT OFFICE 2,409,551

AIRCRAFT PROPULSION

Maurice L. Donnellan, Ypsilanti, Mich.

Application June 15, 1942, Serial No. 447,099

1 Claim. (Cl. 170—135.5)

The main objects of this invention are:

First, to provide an improved aircraft propulsion device including means for driving the propeller of an aircraft at different selectively available speeds, to thereby greatly improve the power, maneuverability, and efficiency of the craft.

Second, to provide an aircraft propulsion device of the type described including a transmission or selective speed changing device interposed between the prime mover and the propeller of the aircraft for the purposes noted above.

Third, to provide an aircraft propulsion device of the type described enabling the use of a propeller of larger size and tractile capacity than has been previously employed, in turn enabling many advantages from the standpoint of performance and maneuverability to be attained.

Fourth, to provide an aircraft propulsion device of the type described enabling a craft to take off and land in a substantially reduced amount of space and which renders the craft substantially more mobile on the ground.

Fifth, to provide a device of the type described which enables the climbing ability of the craft to be greatly increased, at the same time affording the pilot an increased degree of control over the craft.

Sixth, to provide an aircraft propulsion device which is particularly adapted to both troposphere and stratosphere flying, enabling rapid climbing in the troposphere and rapid flying in the stratosphere.

Seventh, to provide a propulsion device for an aircraft of the type described which is economical of fuel, likewise saves wear and tear on the engine prime mover and affords improved results for an engine of given horse-power at a given R. P. M.

Further objects relating to details and economies of my invention will appear from the description to follow. The invention is defined in the claim.

A structure embodying the features of my invention is illustrated in the accompanying drawings, wherein.

Figure 1:
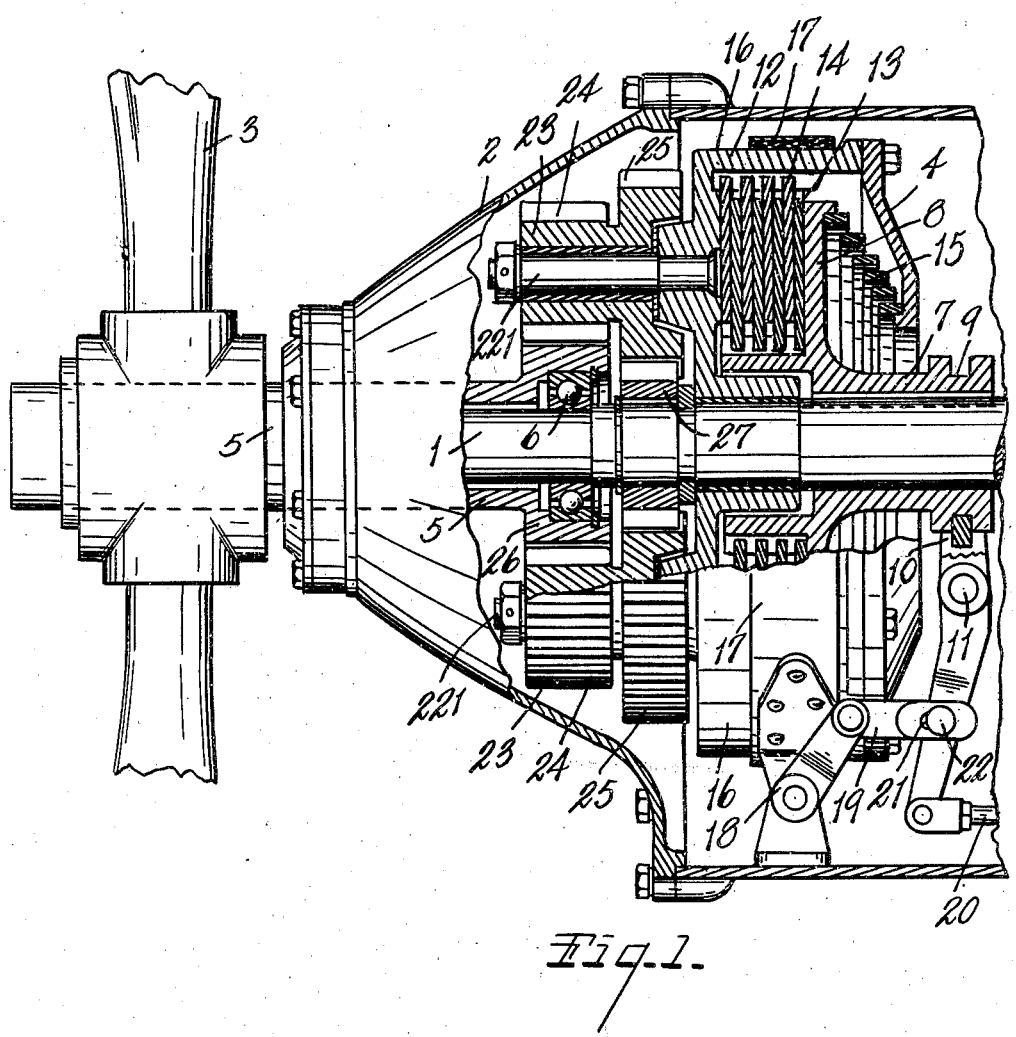
Fig. 1 is a somewhat conventionalized fragmentary view in side elevation partially broken away and in longitudinal vertical section, illustrating a propulsion device in accordance with my invention, including an aircraft propeller, engine driven propeller drive shaft and transmission means interposed therebetween.

In the drawings no attempt has been made to illustrate with accuracy various details of structure, such as bearings, necessary close operating clearances, proportions, or other similar features not germane to the invention. The drawings illustrate the principle of the invention in two embodiments thereof and those skilled in the art will readily appreciate the need for and be able to devise certain structural and mechanical refinements in the structure shown which may be desirable under actual operating conditions.

The present invention relates to an aircraft propulsion device capable of driving the aircraft propeller at two selectively available speeds, and in the illustrated embodiments the provisions for this end in general require the association with and between the usual engine driven propeller drive shaft of the aircraft and the propeller thereof of a multispeed transmission selectively actuable by the pilot to drive the propeller from said shaft at two or more speeds. In the illustrated embodiment a planetary transmission of a well known type is employed, inasmuch as it presents a highly simplified structure without entailing great weight, and without necessitating meshing of the various gears to effect the desired changes in speed ratio. However, it will be appreciated by those skilled in the art that other transmissions may be employed and still accomplish certain of the purposes accomplished by the structure herein disclosed.

Recent developments clearly indicate that in the future a large percent of commercial flying will be done in the stratosphere, by reason of uniform weather conditions encountered at that elevation. However, it is a fact that present day aircraft propulsion systems leave much to be desired, because of a lack of sufficient propeller area to permit desired tractile results in the rarified atmosphere of the stratosphere; likewise there is much to be desired in the climbing ability in the troposphere of planes equipped with present day propellers. This need has not been entirely satisfied by the development in variable pitch propellers.

The present arrangement permits the use of a propeller ideal for troposphere and stratosphere purposes, providing a selectively available propeller torque. The invention also enables a pilot to produce an air-brake action in landing, by simply reducing the propeller speed upon touching the ground, without relinquishing control of the craft by shutting off or dethrottling the engine. By the same token the amount of space required to take off is greatly reduced. Furthermore the present structure enables the propeller speed to be controlled or even terminated without altering engine speed or shutting off the engine, which is useful in gliding.

Referring to the drawings the reference numeral 1 designates a propeller drive shaft which is drivingly connected to or integral with the engine crank shaft (not shown). This shaft is appropriately journaled in the engine housing, to which the casing or cowling 2 for the transmission of the present propulsion device is rigidly attached. The reference numeral 3 designates a propeller and the reference numeral 4 in general designates the transmission of the present device, which is operatively interposed between and drivingly connected to the propeller drive shaft 1 and the propeller 3 to enable the latter to be driven at different selectively available speeds.

In an embodiment of the invention which is characterized by a highly desirable simplicity of construction, I have chosen to employ, as illustrated in Fig. 1, a transmission of the type generally known as the planetary transmission, the latter being drivingly associated with an elongated sleeve or tubular shaft 5 arranged concentrically and telescopingly with reference to the propeller shart 1. Tubular shaft 5 is journaled on said shaft 1 for free rotation relative thereto by means of a ball bearing 6, and may be similarly journaled forwardly of the nose of the casing 2 and immediately to the rear of the propeller 3 by similar bearing means. As stated no attempt has been made to illustrate the particular, highly accurate type of bearings which will be necessary in a high speed installation of the type under consideration. Those skilled in the art will readily devise means for sustaining axial propeller thrust and providing proper and accurate radial support.

The transmission 4 includes an axially slidable shifting sleeve 7 at the rear thereof carrying an integral end thrust plate 8 of substantial diameter. Sleeve 7 is keyed or splined to the drive shaft for rotation therewith at all times and is provided with an annularly grooved shifting collar 9 engageable by the shifting fork 10 which is pivoted to the casing at 11, whereby pivotal movement of said fork effects shifting of the sleeve and plate 8 axially of the drive shaft 1.

The reference numeral 12 designates a clutch or brake drum on shaft 1 concentric with the clutch plate 8 and axially overlapping the same. Drum 12 is mounted for rotation relative to shaft 1 by an appropriate anti-friction bearing. The plate carrying sleeve 7 and the drum 12 laterally have splined thereto in the axial space therebetween the friction clutch disks 13, 14, respectively, the arrangement being similar to conventional clutches of this type, so that when plate 8 is urged axially toward the drum, this being effected by a coiled thrust spring 15 interposed between said plate and the casing end, the drum is frictionally locked to the plate for rotation therewith as the plate is driven by propeller shaft 1. The external peripheral surface 16 of the drum 12 has a frictional brake band 17 arranged therearound, said band being adapted to be tightened into gripping and halting engagement with the drum by means of a linkage indicated by the reference numeral 18. Band 17 thereby holds drum 12 against rotation when the latter is released from the above described driving connection of the clutch plate 8.

Linkage 18 is connected to the shifter fork 10 by means of a lost motion link 19 in such manner that as the fork is actuated to release the drum from driving connection to plate 8, the brake band 17 is simultaneously tensioned on the drum and holds the latter from rotation relative to the shaft 1. Actuation of fork 10 to the left in Fig. 1 to accomplish this is effected by a suitable pedal controlled connecting or thrust rod 20 pivotally connected to the free end of the fork, this release taking place against the force of spring 15. Spring 15 serves to return the fork to the right as it urges plate 8 forwardly into clutching position when rod 20 is released.

It will be noted that the link 19 is provided with an elongated slot 21 by which it is articulated to a pin 22 on the fork 10. This provides a neutral phase in which the propeller is drivingly disconnected from shaft 1, which is desirable in certain maneuvering, for example, in gliding with a stalled motor. In order to release drum 12 from fixed driving relation to plate 8, the latter must be retracted to the right, as viewed in Fig. 1, against the force of spring 15, which is accomplished by the pilot in actuating thrust rod 20 to the left. The elongated slot 21, however, permits a slight lost motion between the actuation of line 19 and linkage 18 to tighten brake band 17, and the release clutch plate 8 from thrust engagement with the coacting frictional disks 13, 14. Said lost motion defines a neutral position in whih the propeller is drivingly disconnected from the engine. This is of great value in gliding.

Drum 12 is provided with a plurality of axially extending pins 221 on which the planetary double or cluster pinions 23 are journaled by appropriate bearings. Each of these cluster pinions has sets of teeth 24, 25 respectively of different pitch diameter meshing, respectively, with a gear 26 integral with tubular shaft 5 and with a gear 27 keyed to the propeller drive shaft 1 for rotation therewith. Appropriate spacers are provided between pinion 23 and drum 12; likewise between gear 27 and the drum, all of which particular details form no part of the present invention.

The foregoing transmission provides two distinct propeller speeds, related to one another in accordance with the proportioning and size of the coacting pairs of pinions and gears 24, 26 and 25, 27. In operation, with the clutch plate 8 projected by spring 15 to the left so as to frictionally engage drum 12 with the plate, accompanied by release of brake band 17 in the manner described above, the drum and plate rotate as a unit by reason of the keyed connection of the latter to propeller shaft 1. Since gear 27 is also keyed to the shaft, the pinions 23 are translated around the shaft in rigid relation to said gear and to their respective mounting pins, thereby driving the gear 26 and tubular shaft 5 with the shaft 1. This constitutes a direct drive from the engine or prime mover of the craft to the propeller which is secured on the tubular shaft 5. When clutch plate 8 is actuated in the opposite direction, or to the right, as viewed in Fig. 1, thereby releasing the drum 12 from rotation by the shaft driven plate, and when the brake band 17 is applied to immobilize the drum, the result is that shaft 1 is driven at a different speed through the following train: shaft 1, gear 27, pinion 25, pinion 24 and gear 26 on shaft 5. In the illustrated embodiment, this effects a reduced speed drive by reason of the fact that pinion 24 is smaller in pitch diameter than pinion 25. A greater torque is developed, capable of rotating a decidedly larger propeller, with resultant increase in air traction for a given engine speed. It is evident that this is a highly desirable feature in taking off from a relatively small air-port or landing surface; likewise in climbing. The pilot may take off in reduced speed ratio, achieving a high torque by speeding the engine, then when proper elevation has been reached, shift to the direct drive, with less load on the engine. In landing, it is possible to produce a distinct braking effect without altering engine speed by simply shifting from direct to indirect drive, at which a reduction in propeller speed takes place. This reduces the space required in landing. It is also contemplated that a transmission embodying a reverse gear assembly may be employed if desired, for the purpose of reversing the propeller in landing, to thereby multiply the aforesaid braking effect. Such a reversing feature obviously adds greatly also to the maneuverability of the craft on the ground.

It will also be apparent to those skilled in the art that, if found desirable, the ratio of the meshing pinions and gears 24, 26 and 25, 27 respectively may conceivably be reversed, thereby producing an overdrive, i. e., a propeller speed greater than that produced by the direct drive in which the pinions, gears, drum and plate rotate as a unit, without increasing the engine speed.

Figure 2:
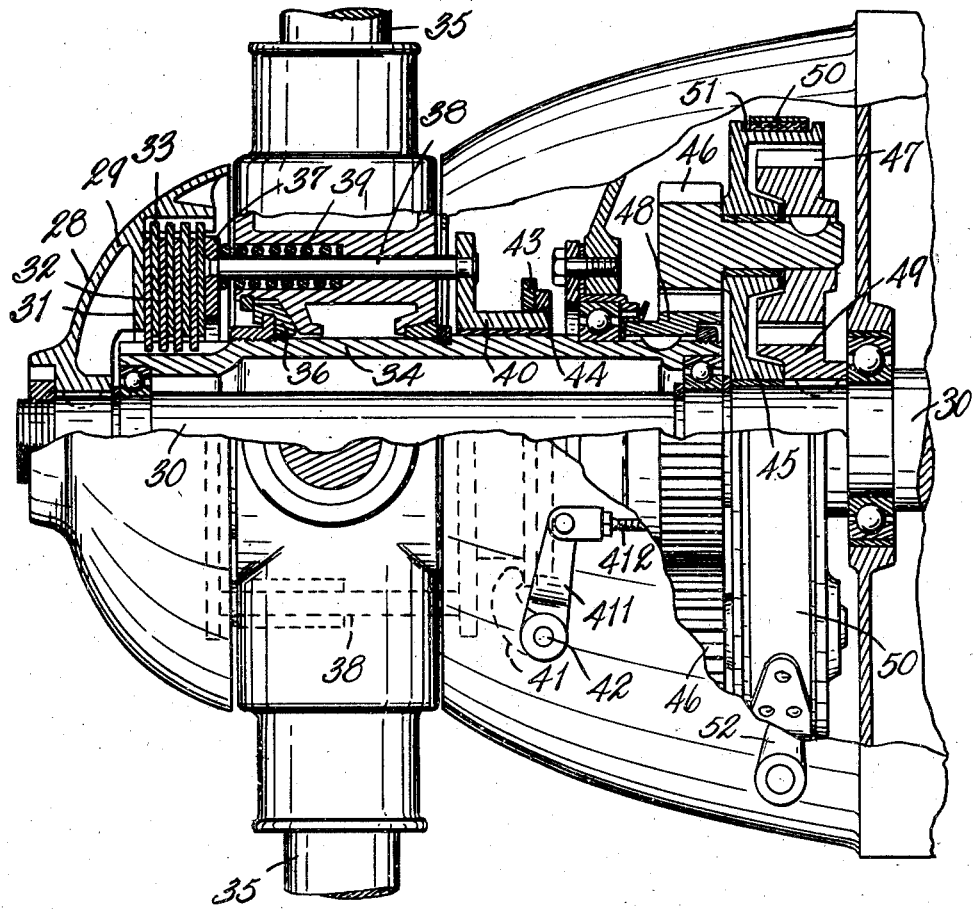
Fig. 2 is a view generally similar to Fig. 1, illustrating an alternative embodiment contemplated by the invention which presents certain advantages over the arrangement of Fig. 1.

In Fig. 2 I illustrate a somewhat modified embodiment of the invention, incorporating the same general principles however, in which the disk clutch assembly, generally designated 28, is arranged in front of the propeller. This includes a rotatable dome 29 keyed to the engine driven shaft 30 and having an integral clutch plate 31, likewise a plurality of friction clutch disks 32, keyed thereto and alternating with similar disks 33 splined on the tubular shaft 34, which is rotatably mounted by suitable bearings on the engine driven shaft. The propeller 35 is secured to shaft 34 for rotation therewith by means of a locking or clamping ring arrangement 36 not necessary to describe in detail. An annular clutch plate 37 carried on pins 38 extending through the propeller mounting is provided to apply end thrust to the aforesaid clutch disks, the propeller mounting having a counterbore in which thrust springs 39 are disposed in encircling relation to pins 38 for this purpose, said springs bearing against the rear of plate 37. In order to retract plate 37 and disengage the clutch disks, pins 38 are secured at their rear ends to an annular shifting collar 40 slidable axially on shaft 34. Said collar is retractible by actuation of the bell crank shifting finger or fingers 41 pivoted to a fixed support in the cowling at 42 and engageable with an anti-friction ring 43 which abuts a shoulder 44 on the collar. Said actuation is produced by manual or pedal operation of the lever arm 411 secured to said finger, through the operating rod 412.

In the embodiment presently under consideration, the drum of the transmission is designated 45, being rotatable on shaft 30 and provided with suitable bearings for the rotatable reception of the planetary pinions 46, 47, which are illustrated as coaxially keyed to one another for rotation on opposite axial sides of the drum. In effect this arrangement is the same as the cluster pinion structure of Fig. 1. Pinion 46 meshes with the teeth of ring gear 48 which is keyed to tubular shaft 34, while pinion 47 meshes with a gear 49 keyed to the propeller drive shaft 30. A brake band 50 surrounds and frictionally coacts releasably with the outer surface 51 of drum 45, in the manner described with reference to the first embodiment. The clutch release lever 411 is operatively articulated to the lever 52 controlling said brake band by means of a lost motion connection 53, illustrated in Fig. 3, which is similar in operation to the structure shown in Fig. 1, save that rod 412 is a tension rod shiftable to the right to release the clutch and engage the brake. The action in affording a neutral position intermediate the two speeds of the transmission is similar to the arrangement in Fig. 1.

Figure 3:
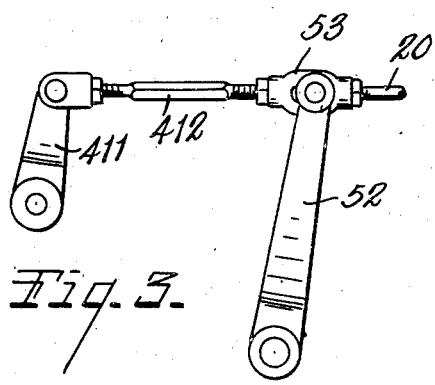
Fig. 3 is a detail view in side elevation illustrating conventionally the actuating linkage of the device illustrated in Fig. 2.

In operation of the structure shown in Figs. 2 and 3, with the clutch plate 37 retracted to the right, thereby freeing the sleeve 34 from rotation with the dome 28 and propeller drive shaft 30, and with brake band 50 applied to the drum to prevent rotation thereof, the propeller drive takes place through the following train: shaft 30, gear 49, pinion 47, pinion 46, ring gear 48, shaft 34 to which said ring gear 48 is secured, and the propeller secured to the shaft. In the embodiment illustrated this will be a reduced speed and increased torque connection. With the clutch plates 31, 27 and disks 32, 33 frictionally engaged and brake band 50 released to permit rotation of the drum 45, there is provided a direct drive to the propeller through shaft 30, dome 28 secured thereto and disks 32, 33 securing the shaft for rotation with the dome. Intermediate these positions, just as in the embodiment of Fig. 1, the tubular shaft is disconnected from the engine driven shaft entirely in a neutral position, for use in gliding should this be desired.

The embodiment of Figs. 2 and 3 has the advantage that it locates the disk clutch assembly forwardly of the propeller in a readily available and convenient position for servicing without the necessity of taking down other parts. It also locates the propeller somewhat closer to the main engine housing or cowling in the interest of reducing radial whip and enabling appropriate bearing provisions to be installed. No attempt has been made to illustrate such provisions, inasmuch as they constitute no part of the invention.

In the embodiments illustrated the propulsion device constituted by the propeller, tubular propeller carrying shaft, transmission and engine driven propeller drive shaft enable great torque to be had when it is desired, facilitating climbing and forward propulsion in the troposphere and stratosphere; likewise greatly facilitating landing by providing in effect an air brake which is available by simply decreasing the propeller speed for a given engine R. P. M. Control of glide with the motor idling or at full throttle, as distinguished from a dead engine, is also a very desirable feature. This device in large measure supplants the functions of the variable pitch propeller, substituting therefor a very simple device indeed which is not subject to failure or loss of effectiveness to any appreciable degree under normal reasonable maintenance.

Embodiments of the invention which incorporate the principles of the invention in a highly desirable manner have been illustrated and described, though I am aware that other embodiments within the intent of the invention will suggest themselves to those skilled in the art. It should be understood that the foregoing terminology is used only descriptively rather than in a limiting sense, and with full intention to include equivalents of the features shown and described, within the scope of the following claim.

Having thus described my invention, what I claim as new and desire to secure by Letters Patent is:

In a power transmission system for driving a fixed blade aircraft propeller from a power driven shaft, the combination of a sleeve concentric with the driven shaft, a propeller hub secured to said sleeve, a clutch member carried by said hub forwardly of the propeller and arranged upon engagement to drive said sleeve from said shaft at the same speed, a transmission connecting said shaft with said sleeve for driving said sleeve at a different speed from the speed of such shaft when said clutch is disengaged, and operating means for simultaneously effecting a timed engagement and disengagement of said clutch with relation to the driving of said sleeve through said transmission, and comprising clutch operating members extending through said hub, means for blocking the operation of said transmission, and a connecting link between said clutch operating member and said transmission blocking means whereby the said transmission is rendered inoperative when the clutch is engaged and said shaft and sleeve are connected thereby in driving relation, and said transmission is rendered operative only when said clutch is disengaged.

MAURICE L. DONNELLAN.